United States Patent [19]

Bergkvist

[11] 4,033,534

[45] July 5, 1977

[54] POSITIONING DEVICE FOR TUBES TO BE EMBEDDED IN SURROUNDING CAST MATERIAL

[76] Inventor: Häkan Georg Frithiof Bergkvist, Majorsgatan 31, Varnamo, Sweden

[22] Filed: Sept. 22, 1975

[21] Appl. No.: 615,826

[30] Foreign Application Priority Data

Sept. 24, 1974 Sweden .............................. 7411995

[52] U.S. Cl. .............................. 248/49; 52/678; 52/689; 248/74 PB; 248/DIG. 9
[51] Int. Cl.² .......................................... F16L 3/12
[58] Field of Search ............ 248/49, DIG. 9, 74 PB; 52/677, 678, 684–689, 98

[56] References Cited

UNITED STATES PATENTS

| 1,362,707 | 12/1920 | Lampert ............................... 52/684 |
| 3,170,663 | 2/1965 | Fite ...................................... 248/49 |
| 3,255,565 | 6/1966 | Menzel ................................. 52/678 |
| 3,471,987 | 10/1969 | Yelsma ............................. 52/689 X |
| 3,745,737 | 7/1973 | Keller et al. ......................... 52/687 |
| 3,860,119 | 1/1975 | Irvine ............................ 248/DIG. 9 |

FOREIGN PATENTS OR APPLICATIONS

| 244,115 | 4/1963 | Australia .............................. 52/689 |
| 407,773 | 8/1968 | Australia .............................. 52/686 |
| 431,000 | 8/1967 | Switzerland ........................ 52/687 |
| 396,373 | 1/1966 | Switzerland ........................ 52/678 |
| 1,206,545 | 9/1970 | United Kingdom ................. 52/678 |

*Primary Examiner*—Roy D. Frazier
*Assistant Examiner*—Rodney H. Bonck
*Attorney, Agent, or Firm*—Hammond & Littell

[57] ABSTRACT

A device for positioning and firmly supporting a length of tubing or pipe parallel to but spaced from a foundation, wall or other surface is provided by a hollow cylindrical body (preferably of plastic) the top end of which is arcuately shaped to provided a bed for said tube and the bottom end of which is shaped so as to provide members or legs and flow channels suitable for admission of cement into the inner part of the cylindrical body. The supporting members carry regularly spaced circumferential scoring or notches as guides to permit either or both members to be cut perpendicularly to the main axis of the cylindrical body by a predetermined amount, and they carry lugs (preferably of a length equal to the length of the scoring) to permit the device to be nailed or bolted to a surface. The top optionally carries a strap for securing the tubing to the bed.

5 Claims, 4 Drawing Figures

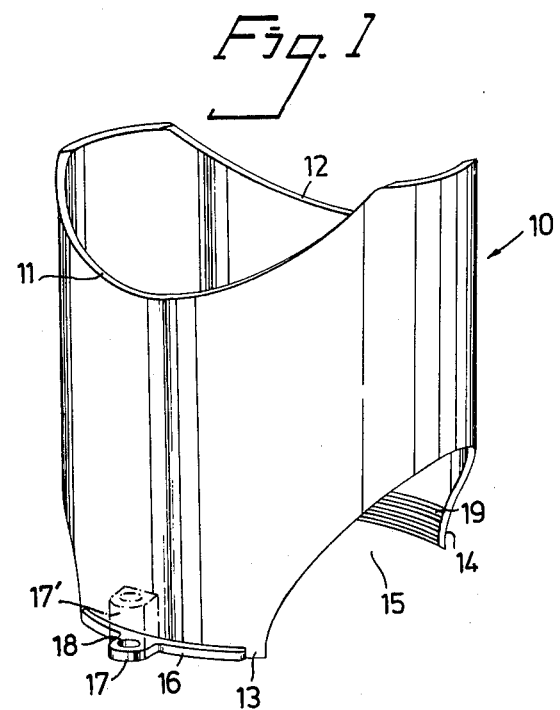
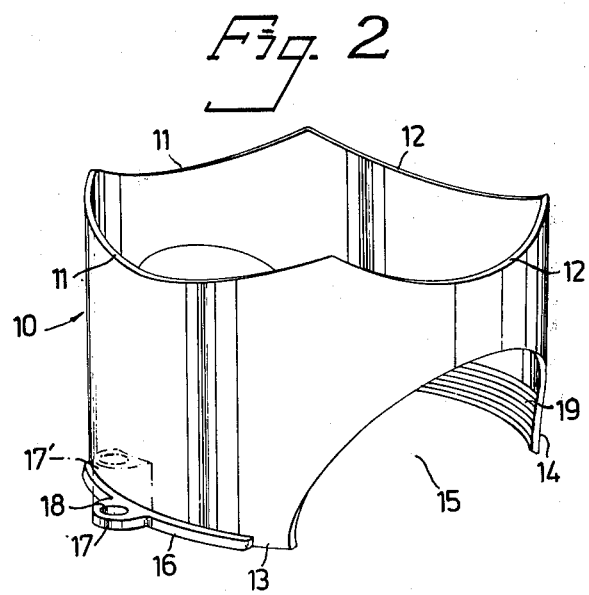

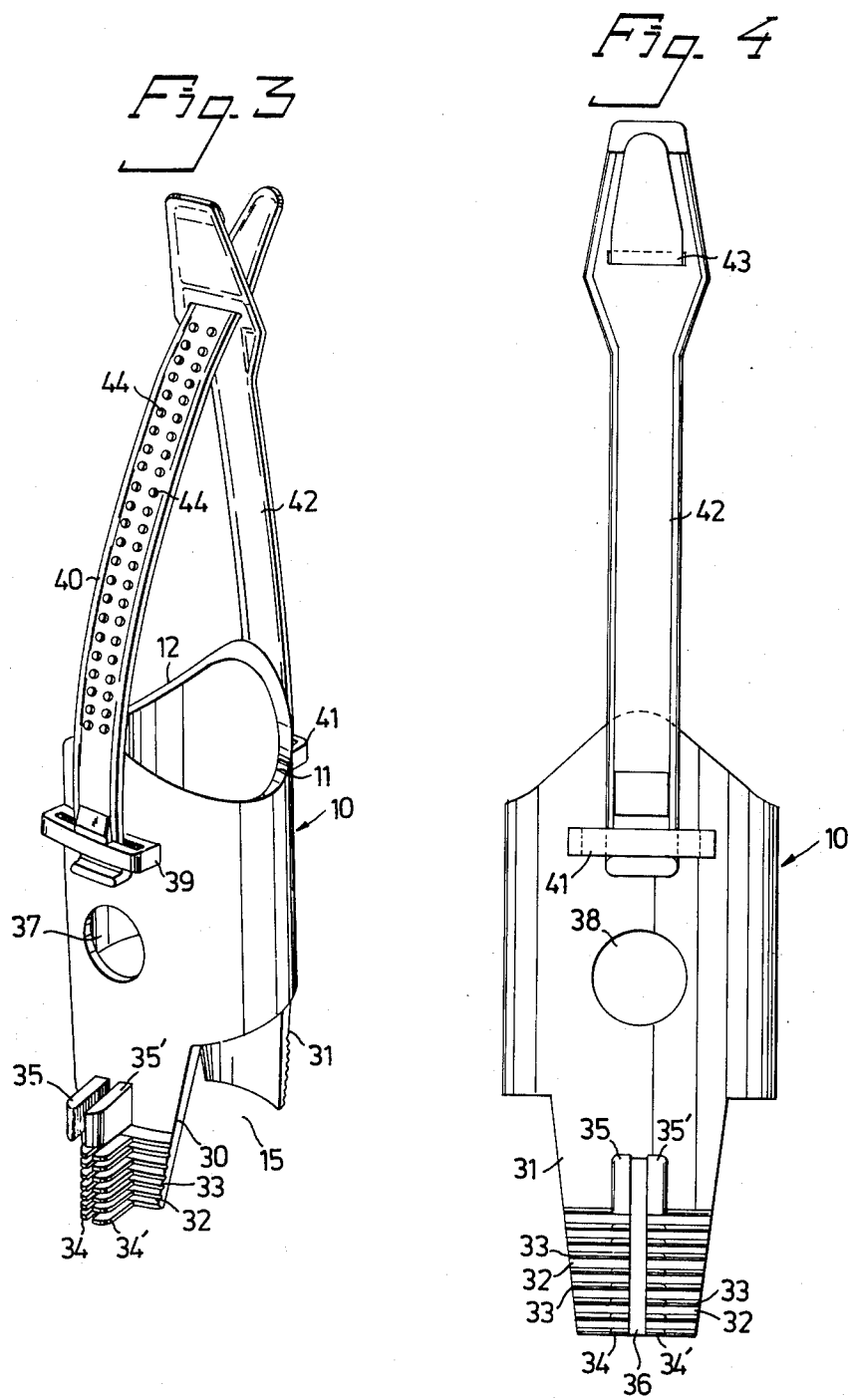

POSITIONING DEVICE FOR TUBES TO BE EMBEDDED IN SURROUNDING CAST MATERIAL

The invention relates to a positioning device especially for tubes to be embedded in surrounding cast vault structures, which device comprises a hollow, long or comparatively long body preferably of cylindric shape and made of a material, which is easy to shape by means of tools, and the upper free portion of which exhibits at least one recess of cup or semicircular shape, which recess serves the purpose of bearing surface for said tube, which thereby is fixed in a position across the longitudinal axis of the body, the lower portion of the body being shaped with two opposed supporting legs with horizontal or substantially horizontal bearing surfaces, which cooperate with a foundation, an opening extending all through said body between said supporting legs being formed.

In connection with casting of by way of example vaults, it is an often recurring problem that tubes of different dimensions shall be fixed at certain distances from a foundation in order subsequently to be surrounded by a cast compound. As an additional feature the tubes shall be given a certain inclination in order to obtain a correct slope for the medium flowing through the tube, it therefore being necessary to adjust the supporting means for the tubes with respect to their vertical position.

A device according to the description given in the preamble is known from the Norwegian patent specification No. 119,112, but this rather old design suffers from the drawback that it is not possible to secure the device to the foundation, because of which the position of the tubes can be negatively influenced during the casting procedure. Moreover, a great number of such supporting means of varying height is required in order to obtain the slope of the tube just mentioned, which would involve the necessity of carrying an abnormal quantity in stock. The known technique in the branch in question also includes a device comprising asleeve, which supports two arms movable relative to each other, their free end portions being intended to bear against the foundation. The tube, which is going to be fixed, is threaded through the sleeve and thus has a direction, which is equal to the axial direction of the sleeve, and the height position is intended within certain limits to be regulated by means of bringing together or bringing apart said arms. The drawback in connection with said design is the one that the fixation of the position of the support at a certain height is very difficult to attain. Moreover, the support is bound to one given tubular dimension.

It is an object of the present invention to provide a supporting means for tubes, which is designed in such a way that tubes of varying dimensions can be fixed thereto, and that the support for the tubes in a stable manner can be fixed to a foundation, and further that one in a simple manner and with simple means can attain a certain reduction of the total height of the support of the tubes.

There is now provided a device which attains these objects. The present invention provides a device for firmly and conveniently supporting a length of tubing or pipe (hereinafter for convenience termed "tube")in predetermined spaced relationship from a surface, which comprises a hollow cylindrical body one end of which is arcuately shaped to provide a bed for a tube, the other end of which is shaped to provide members adapted to support said device against a surface and channels to permit cement or similar materials to fill the interior of said body. The supporting end of the device carries scoring or notching uniformly circumferentially spaced thereon, which is adapted to guide cuts to shorten said members by a predetermined amount. The supporting end also carries a lug on each of said support members adapted to permit the device to be nailed or bolted to a surface. The tube support end carries means adapted to secure tubing firmly in the bed.

What is characteristic of the invention is evident from its design exhibiting the features that said supporting legs for one thing are provided with a number of interspaced notches, for example in the form of parallel grooves with even division in order to provide a desired reduction of the length of the either or both supporting legs at the same time as the plane or substantially plane bearing surfaces are maintained, and for another thing that the supporting legs are provided with means for the anchoring of the device to a foundation thereby fixing its position relative to said foundation, in which connection said means are designed in such a way that said fixation of the position can take place irrespective of the circumstance that the length of the supporting legs has been reduced.

According to an embodiment of the invention the parallel grooves are located on the inside of the respective supporting leg, the means for anchoring of the device to the foundation comprising elements provided with a vertical through bore, one element being mounted on the outside of each supporting leg, said elements extending from the lower edge of the respective supporting leg for a certain distance in upwards direction.

According to another embodiment the parallel grooves are located at the outside of each supporting leg, and the means for the anchoring of the device to the foundation comprises fin or flap-shaped elements.

Additional advantages and characteristics of the invention are evident from the following description of three embodiments, reference being made to the accompanying drawings, in which FIG. 1 is a perspective view of a first embodiment of support for tubes according to the invention, FIG. 2 is a perspective view of a second embodiment of a support for tubes according to the invention, FIG. 3 is a perspective view of a third embodiment of a support for tubes according to the invention, and FIG. 4 is a side elevational view of the support for tubes according to FIG. 3.

The support for tubes according to the invention comprises a hollow-shaped body 10 of a material, which easily can be shaped by means of tools, the material preferably being plastics. The body 10 in the examples illustrated is of cylindrical form, but also other forms can come into consideration. The upperportion of the support for the tubes in the embodiment according to FIG. 1 is provided with two opposing cup-shaped recesses 11, 12 serving the purpose to receive a tube, not shown, in order to make possible the determination of the position of the tube at a certain distance from a foundation (not shown), upon which the tube is intended to rest. The lower portion of the support for tubes exhibits for one thing two opposing supporting legs 13, 14 with horizontal or substantially horizontal bearing surfaces, and for another thing an opening 15 extending all through said lower portion. In the embodiments according to the FIGS. 1 and 2 the opening 15 exhibits a semicircular shape, but other shapes can be used. According to the FIGS. 1 and 2 a flange 16 projects from the supporting legs 13 and 14, said flange being provided with a bead 17 exhibiting a vertical through center bore 18. As is hinted with dashed lines in the FIGS. 1 and 2, the bead 17 can be shaped in such a way that it extends for a certain distance in upwards direction, hinted at 17'. The inner sides of the supporting legs 13, 14 exhibit marks or scoring 19, which in connection with the examples illustrated in FIGS. 1 and 2 comprise concentric notches and these notches have a vertical extension in any case not higher than the height of the bead 17'.

The embodiment according to the FIG. 2 is identical to the one according to FIG. 1 with the exception that the upper portion of the support for the tubes exhibits recesses, the paths of their extensions crossing each other, which permits one and the same support for tubes to be utilized for tubes laid crosswise.

In the embodiment according to the FIGS. 3 and 4 the bottom portion of the hollow-shaped body 10 exhibits downwards tapering supporting legs 30,31. The outer surfaces of the supporting legs 30,31 are provided with a number of notches 32 extending across the longitudinal axis of the body 10. Each such notch 32 is defined by an upper and a lower flange 33, and the distance between the undersides of two adjacent flanges has a predetermined measure, by way of Example 2 mm. From each such flange extend outwardly two projecting and relatively thin fin pairs 34,34' positioned at a certain distance from one another, and all these fin pairs 34,34' are arranged one above the other which means that a vertical through aperture 36 is formed by the horizontal distance between the fin pairs. In the example shown the new support for tubes is provided with two end center apertured lugs 35,35', which are considerably longer and heavier than the fins 34,34'.

It is also advantageous to be able to fix the position of one or several tubes in the recesses 11,12 and according to the invention it is suggested that the upper portion of the hollow-shapedbody 10 be provided with a fastening means 39 in order to take up one end of a band 40 and a fastening means 41 located in opposed position in order to take up one end of another band 42. The free end of the band 42 has a slit 43, in which the free end of the band 40 is introduced and the last mentioned band on one side exhibits a number of knobs 44 for locking action together with the slit 43. When the tube has been placed in the recesses 11,12 the band is stretched around the tube, which thereby gets locked in the determined position.

The support for tubes according to the invention is placed on top of a foundation (not shown), where it is given a securefixation especially with respect to the radial forces, which arise, when the casting compound is poured, a nail being introduced from above through the bore 18 and 36 respectively, in which connection the distance between a pair of fins 34,34' or lugs 35,35' of course is shorter than the diameter of the head of the nail. In those cases, when it is desired that the length of the support of the tubes be reduced, the notches 19 and 32 respectively are utilized serving as indications for the location of the cuts. As mentioned the notches 19 and 32 respectively are arranged at a uniform distance, and by following a chosen notch, when the cutting operation, which can be performed with a knife, is taking place, the new height of the support for the tubes is rapidly obtained employing simple means.

The surfaces bearing against the foundation do not exclusively comprise the thickness of the material of the body 10, as the bead of the supporting legs 13,14 and 30,31 respectively as well as the fins 34,34' contribute to the stability and anchoring possibility relative to the foundation being maintained by a portion of the bead 17 and the fins 34,34' alternatively lugs 35,35' always being left irrespective of the height of the support of the tubes having been reduced. Hence it follows that it is suitable to let these heads 17 and 17' respectively alternatively 34,34' (35,35') extend somewhat higher in upwards direction than the notches 19 and 19 and 32 respectively.

The support for tubes according to the invention is suitably manufactured as a unit. Instead of the bore 18 and 36 respectively one can of course use some other notch, and the same goes for the marks 19 and 32 respectively, which can be made in a different manner. In connection with the casting procedure the recesses 15 (FIGS. 1 and 2) and the recesses 37,38 (FIGS. 3 and 4) serve the purpose of securing that the inner space of the support will be filled with casting compound.

What I claim is:

1. A device for firmly supporting a length of tube in predetermined spaced relationship from a surface, which comprises a hollow normally vertical cylindrical body the upper end of which is arcuately shaped to provide a bed for a tube, and the lower end of which is shaped to provide members adapted to support said device on a surface and channels adapted to permit cement to flow into and fill the interior of said body when flowed thereon; circumferential, uniformly spaced guide scoring on said support members adapted to guide cuts to shorten said members by a predetermined amount; a center apertured lug on each of said support members spaced from said lower end, said lug being adapted to permit said device to be nailed or bolted to a surface, and openable locking means adapted to secure a length of tubing in said bed, a plurality of fin pairs under said lug, each fin pair extending horizontally from each score in said guide scoring, the fins of said fin pairs being spaced horizontally apart by a distance about equal to the bore of said lug, the spaces thus formed being in vertical register with the bore of said lug; said fin pairs being adapted to provide support for said device when said support members are shortened by cuts through said guide scoring.

2. A device according to claim 1 wherein said scoring is located on the inside of said support members.

3. A device according to claim 1 wherein said scoring is located on the outside of said support members.

4. A device according to claim 1 wherein said means to secure said length of tubing are strap means.

5. A device according to claim 1 composed of plastic.

* * * * *